Patented Nov. 16, 1937

2,099,293

UNITED STATES PATENT OFFICE 2,099,293

CHEMICAL COMPOUND AND USE THEREFOR

Willi Brun, Stratford, Conn., assignor to Remington Arms Company, Inc., a corporation of Delaware No Drawing. Application August 3, 1935, Serial No. 34,636

6 Claims. (Cl. 52—4)

This invention relates to ammunition priming mixtures, and contemplates the use therein of a hitherto unknown explosive ingredient.

The normal lead salt of styphnic acid has acquired substantial use in the fields of priming mixtures and detonators, and the basic lead salt of this acid, particularly in the form described in this applicant's Patent No. 1,942,274, has also been utilized for this purpose. Other styphnates which are sufficiently insoluble to be of utility have not hitherto been known.

The present invention comprises the discovery of a new explosive insoluble styphnate, namely, thallium styphnate. This salt may be prepared as follows:

Into a solution of a soluble styphnate, such as that of magnesium, there is dropped a solution of thallous nitrate, the quantity of the thallous nitrate being slightly in excess of the theoretically reacting quantity. The proportions of the various ingredients may be as follows: 8 grams of styphnic acid (1/30 mol.) and 1.344 grams of magnesium (1/30 mol.) are dissolved in 240 c. c. of water. A second solution is prepared by dissolving 20 grams (1/15 mol. plus about 13% excess) of thallous nitrate in 120 c. c. of water. The magnesium styphnate solution is filtered and brought to a temperature of 85° C. The thallous nitrate solution is dropped in rapidly while the reacting solution is actively agitated. After the addition of the thallous nitrate is complete, sufficient water is added to make up for evaporation loss. Superior thallium styphnate crystals of desirable size are secured if the supernatant liquid is filtered off before it is allowed to cool, since upon cooling the salt tends to precipitate in fine particles. The crystals recovered from the filter are washed with cold water and dried at a moderate temperature.

Thallium styphnate secured in this way forms a very desirable explosive ingredient for ammunition priming compositions, typical mixtures being as follows:

|  | Per cent |
|---|---|
| Mercury fulminate | 10 to 35, preferably 20 |
| Thallium styphnate | 5 to 30, preferably 20 |
| Antimony sulphide | 5 to 20, preferably 9 |
| Calcium silicide | 5 to 15, preferably 7 |
| Lead peroxide | 3 to 10, preferably 7 |
| Barium nitrate | 10 to 50, preferably 37 |

|  | Per cent |
|---|---|
| Guanylnitrosaminoguanyltetrazene | 1 to 4, preferably 2 |
| Thallium styphnate | 30 to 45, preferably 38 |
| Barium nitrate | 25 to 60, preferably 39 |
| Lead peroxide | 3 to 15, preferably 5 |
| Antimony sulphide | 2 to 20, preferably 5 |
| Calcium silicide | 2 to 20, preferably 11 |

Other sensitizers, oxidizers and fuels may be utilized, and the proportions of the ingredients may be varied widely. Likewise, other methods for the production of thallium styphnate may be practiced, the invention being limited only by a broad construction of the appended claims.

What is claimed is:

1. A thallium salt of styphnic acid.

2. An ammunition priming mixture containing a thallium styphnate.

3. An ammunition priming mixture consisting substantially of

|  | Per cent |
|---|---|
| Mercury fulminate | 10 to 35, preferably 20 |
| Thallium styphnate | 5 to 30, preferably 20 |
| Antimony sulphide | 5 to 20, preferably 9 |
| Calcium silicide | 5 to 15, preferably 7 |
| Lead peroxide | 3 to 10, preferably 7 |
| Barium nitrate | 10 to 50, preferably 37 |

4. The chemical compound precipitated by the addition of a solution of thallous nitrate to a solution of magnesium styphnate.

5. The chemical compound precipitated by the addition of a solution prepared by dissolving thallous nitrate in water in the proportions of 20 grams of thallous nitrate in 120 c. c. of water, to a solution prepared by dissolving magnesium and styphnic acid in water in the proportions of 8 grams of styphnic acid and 1.344 grams of magnesium to 240 c. c. of water.

6. In the preparation of thallium styphnate, the method which comprises the addition of a solution of thallous nitrate to a solution of magnesium styphnate at a temperature of approximately 85° C., and the filtering of the product at approximately the same temperature without intermediate cooling.

WILLI BRUN.